United States Patent
Tovar

[11] 3,750,309
[45] Aug. 7, 1973

[54] DISPLAY BOOK
[75] Inventor: Henry M. Tovar, Cheshire, Conn.
[73] Assignee: Wallace Silversmiths, Inc., Wallingford, Conn.
[22] Filed: Feb. 16, 1972
[21] Appl. No.: 226,890

[52] U.S. Cl............................ 35/53, 281/16, 283/63
[51] Int. Cl.............................................. B42d 1/00
[58] Field of Search ..................... 35/53, 55; 281/16

[56] References Cited
UNITED STATES PATENTS
2,291,257   7/1942   Rider ..................................... 35/53
3,028,178   4/1962   Pietrangeli ............................ 281/16
3,111,949   11/1963  Duncan ................................. 402/31

FOREIGN PATENTS OR APPLICATIONS
623,611   3/1927   France .................................... 35/53

Primary Examiner—Harland S. Skogquist
Attorney—Robert E. Le Blanc, Donald C. Casey et al.

[57] ABSTRACT

A display book for table settings of preselected patterns of silverware, china, and crystal is presented. The book includes a cover, at least one fly-leaf, and a binding containing three separate sets of independently paged leaves, said leaves adapted to have indicia and illustrations printed on the surfaces thereof, the front surface of each leaf in each of said sets bearing a different illustration of representative pieces of a preselected silverware, china, or sterling pattern on a simulated table background, the reverse surface of each leaf in each section bearing informative information and illustrations of additional representative pieces of the corresponding pattern shown on front surface of the adjacent leaf so that when said book is opened a table setting of silverware, china, and crystal in preselected patterns is displayed for primary emphasis while the reverse surfaces of the adjacent leaf sections display identifying information and illustrations of other representative constituents of said patterns for secondary emphasis in a unitary display.

3 Claims, 8 Drawing Figures

PATENTED AUG 7 1973 3,750,309

DISPLAY BOOK

This invention relates to a display book and particularly to a book for displaying tableware patterns designed to portray preselected combinations of silverware, china, and crystal patterns in a unitary display on a simulated table top.

It is difficult for most people, merely by looking at a pattern chart or picture to envision the effect a sterling pattern will achieve in combination with specific china and crystal patterns. Pattern choices in silverware, china, and crystal are usually dictated by their aesthetic interrelationship, and this interrelationship can not be fully explored unless examples of each pattern are viewed together as a table setting.

In addition, the choice of tableware patterns is normally influenced by the overall shape and design of specific pieces, such as the fork, the cup, or the goblet. Therefore, the aesthetic effect of a broad representation of different pieces should be explored simultaneously and a customer will usually desire to view these pieces arranged in a table setting.

The normal method for displaying such articles is to set an actual table for the customer. Then, because display space is usually limited, in order to display different patterns a clerk must physically remove one set of patterns and arrange a different set. As will be appreciated, this method of display has many undesirable features.

This procedure is extremely time-consuming, and because the customer normally is not occupied while patterns are being changed, his attention may be diverted. The customer also may forget the features of previous displays, requiring reconstruction thereof.

This display technique also requires that the merchant keep a nearly complete inventory of patterns in stock, and store the stock or representative pieces thereof adjacent to the display area so that they are readily available for display.

A commonly utilized alternative to a complete display as above described is a table setting display of the most commonly used pieces. This could involve a three-piece place setting of sterling, a dinner plate and a cup and saucer, and the crystal water goblet. This display will give the customer an overall view of complementary patterns, and probably represents a reasonable alternative to providing a complete display. However, once the range of the potential choices has been narrowed, the customer will still prefer to see a complete table setting of the most desirable patterns before a selection is made. This limited display technique will therefore not completely eliminate the need for time-consuming display changes, and the space requirements for display and storage will still be present.

Applicant's assignee has long used a display book for illustrating different patterns of china, sterling flatware, and sterling and silverplate holloware. This prior display book has a backing sheet and binding on three sides thereof.

One binding extends the length of the right edge of the sheet; a second extends the length of the left edge; and a third extends along the central portion only of the top edge. Each binding contains a separate set of independently paged leaves attached to the backing sheet.

The front surfaces of leaves in the central set depict the dinner plate of different china patterns on a simulated tablecloth background while the reverse surfaces thereof carry indicia identifying the china pattern pictured on the next leaf and a suggested complementary silver pattern. The front surfaces of the leaves in the right set depict the place knife, soup and tablespoons of different silver patterns on a simulated tablecloth background. The front surfaces of the leaves of the left set depict the place and salad forks of different silver patterns on a simulated tablecloth background while the reverse surfaces thereof depict the salient features of the silver pattern pictured on the next leaf. A single pattern is then pictured on a leaf in each of the right and left set.

Therefore, by leafing through the three sets of leaves, place settings of silver and china patterns are displayed for a customer.

In addition, a fourth set of leaves is contained in the top binding. These leaves extend from the right binding to the left binding and are disposed in the book between the aforementioned three sets of leaves and the backing sheet. The leaves in the fourth set are intended to be used separately and bear indicia on the surfaces thereof picturing and identifying the constituent pieces of different holloware patterns.

This prior display book includes several undesirable features. Because the pages open from three sides and a top cover is not provided, the book is cumbersome and unwieldy. It must therefore be used on a table or other supporting surface. Unless such a support is provided the intended unitary display of two leaf surfaces from each of the three sets will not be available for viewing. Because the patterns are preferably pictured nearly to scale the book is relatively large and it will be understood then that display space limitations will control the number of customers that may simultaneously use these display books.

Most importantly, however, the format of the prior display book will not lend itself to the display of crystal patterns. As noted above, it is desirable to simultaneously display, in addition to china and sterling patterns, a crystal pattern because the purchaser will normally wish to select complementary patterns of each. If a set of leaves picturing crystal patterns is to be added a set of essential illustrations of silver pattern pieces must be deleted. The result will not be a unitary display of the most commonly utilized pieces on a simulated table background.

It has been discovered, however, that these problems may be solved through utilization of the novel display book of this invention wherein the most commonly utilized pieces of each pattern are displayed on a simulated table background in separately paged leaf sections contained in a cover by a single binding. The data identifying the pattern and its constituent pieces and illustrations of the shapes thereof are depicted on the reverse surface of adjacent leaf sections. In this way, the customer may open the book, select the pattern combination desired, or narrow the range of choices by viewing a unitary table setting display thereof on the front surface of the book leaves. Once the range is narrowed, the opposing rear surface of the previous leaf with identifying information relating to the pattern pictured may be viewed as a secondary reference, and illustrations of other pieces included in the patterns may also be viewed to achieve a unitary display of the patterns. Because each pattern of silverware, china, and crystal is displayed on a separately paged leaf section any desired combination of patterns may be rapidly selected merely by turning to the paged sections of interest. Furthermore, by depicting additional pieces and pattern information on the opposing rear surface of the previous leaf sections such information is immediately available to the customer when desired, and forms a secondary part of the unitary display of the selected patterns.

Although the prior art discloses a variety of display books, the novel book of this invention with a single binding wherein the front surface of the leaves form a simulated table setting display for primary emphasis in combination with the aforementioned additional illustrations and information on the opposing rear surface of the previous leaf sections and on the rear surfaceo of the fly-leaf if desired, for secondary emphasis in a unitary display is not known to be disclosed therein.

Accordingly, it is an object of this invention to provide a display book having separately paged leaf sections for displaying preselected table settings on the front surface thereof with explanatory information and illustrations of additional pieces of the patterns displayed on the front surface of each leaf section, shown on the reverse surface of the previous leaf section.

It is another object to provide a display book for table settings wherein the leaves thereof are divided into three, separately paged sections, a first section depicting silverware patterns, a middle section depicting china patterns, and a third section depicting crystal patterns.

It is another object to provide a display book for table settings wherein the leaves are divided into three, separately paged sections, a front surface of each leaf section picturing constituents of different silverware, china, or crystal patterns while the reverse surface of the previous leaf section depicts identifying information relating to said patterns and illustrates additional constituents of the pattern pictured.

It is a further object to provide a display book for table settings including a front and back cover, at least one fly-leaf, and a binding wherein the leaves are divided into three, separately paged sections, a front surface of each leaf section picturing constituents of different silverware, china, or crystal patterns on a simulated table top background while the opposing surface of the previous leaf sections or the reverse surface of the fly-leaf depicts identifying information therefor and illustrates additional constituents of the pattern pictured on the front surface of the adjacent leaf sections.

It is yet another object to provide a display book for table settings including a front and back cover, at least one fly-leaf, and a releasable binding, wherein the leaves contained therein are divided into three, searately paged sections, a front surface of each leaf section picturing constituents of different silverware, china, or crystal patterns on a simulated table background while the reverse surface of previous leaf sections depicts identifying information therefor and illustrates additional constituents of the pattern pictured, with the reverse surface of the fly-leaf depicting the identifying information and additional illustrations for the patterns illustrated on the front surface of the first leaf sections, said information and additional illustrations being oriented thereon in alignment with the said pattern illustrations.

These and other objects will become readily apparent with reference to the drawings and following description wherein.

Figures 1, 2:
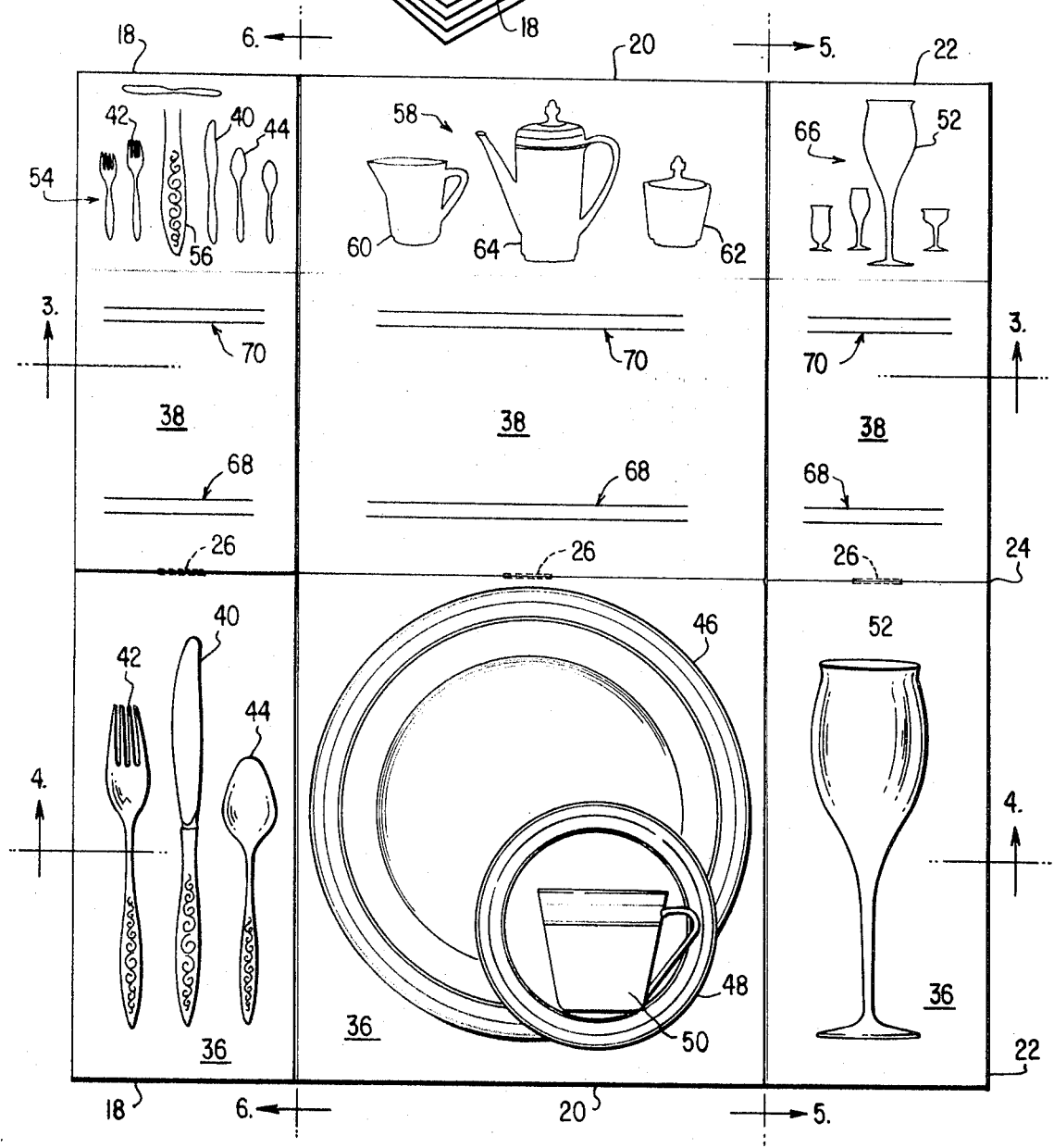
FIG. 1 is a perspective view of the display book of this invention.
FIG. 2 is a plan view of the display book of FIG. 1 opened to illustrate a display of specific silverware, china, and crystal patterns.
Figure 3:
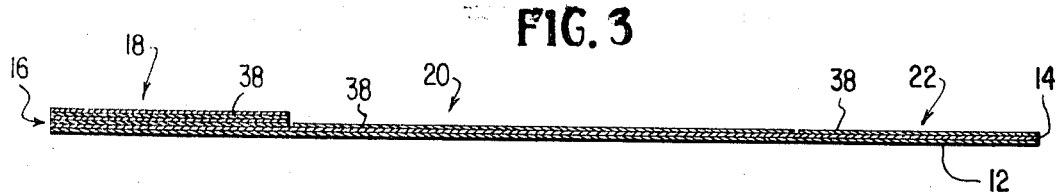
FIG. 3 is a sectional view taken along line 3—3 of FIG. 2.
Figure 4:
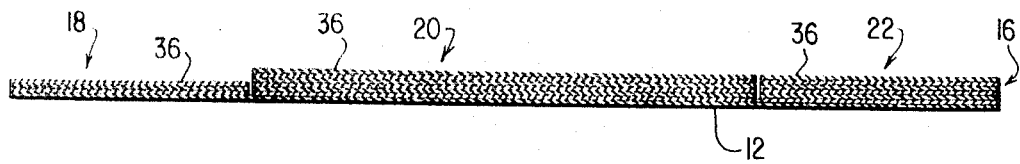
FIG. 4 is a cross-sectional view taken along line 4—4 of FIG. 2.
Figure 8:
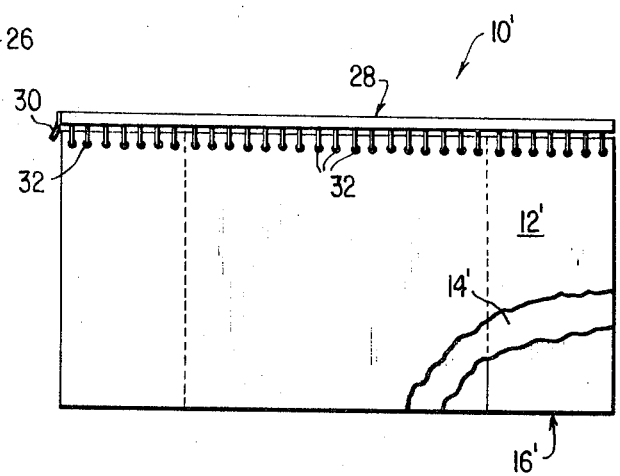
FIG. 8 is an elevation of an embodiment of the display book of this invention having the front cover and fly-leaf partially broken away.

With attention to the drawings FIGS. 1 and 2 illustrate perspective views of thed display book 10 of this invention, in a closed and an open position, respectively. FIG. 8 illustrates an additional embodiment 10' of the display book of this invention as will be subsequently explained.

Figure 7:
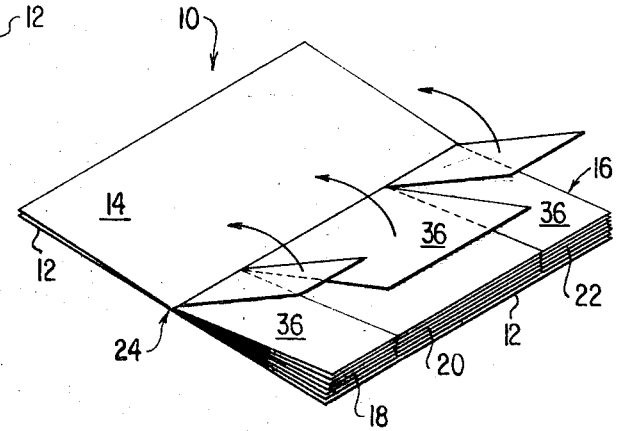
FIG. 7 is a perspective view of the display book of FIG. 1 illustrating the separate leaf sections.

The display book 10 includes an outer cover 12, at least one fly-leaf 14, and three sets of a plurality of independently paged leaves 16. Leaves 16 are divided into a first section 18, a second section 20, and a third section 22 each of which may be separately folded along center fold-line 24 as shown in FIG. 7.

Figure 5:
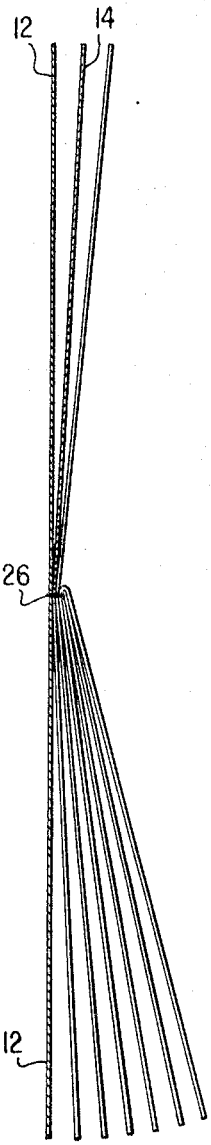
FIG. 5 is a cross-sectional view taken along line 5—5 of FIG. 2.
Figure 6:
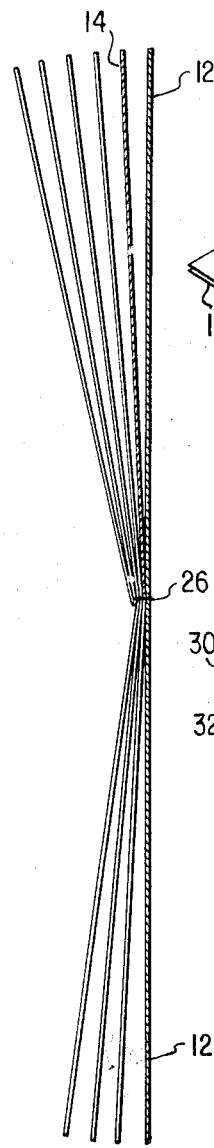
FIG. 6 is a cross-sectional view taken along line 6—6 of FIG. 2.

Any conventional binding may be utilized such as stitching or staples 26 as shown in FIGS. 2, 5 and 6. In the alternate embodiment of the display book of this invention 10' shown in FIG. 8, the binding utilized is a conventional ring binder 28 controlled by detent lever 30. By detenting lever 30 binder 28 may be opened to add additional leaves as desired. It will be noted that the cover 12', fly-leaf 14', and sectioned pages 16' have a plurality of holes 32 spaced along an edge thereof for mounting in binder 28. It should be recognized that the embodiment of FIG. 8 does not require that the pages have a center fold for mounting. In addition, cover 12' may be deleted and binder 28 mounted along the internal surface of a center fold of a separate cover (not shown) by any conventional means if desired.

With attention to FIG. 2 each leaf 16 has a front surface 36 and a reverse surface 38. The front surface 36 of each of said leaves 16 is adapted to display a table setting illustration as follows.

The front surface 36 of each leaf section 18 displays an illustration of the three most common constituents of a silverware place setting, a knife 40, fork 42, and spoon 43 of a preselected pattern. For the purposes of description the term "silverware" is used to include eating utensils constructed of any type of material, such as sterling, silverplate, or stainless steel.

The front surface 36 of each leaf section 20 displays an illustration of the three most common constituents of a china table setting, a dinner plate 46, a saucer 48 and a cup 50 of a preselected china pattern. For the purpose of definition the word "china" is used throughout, but is not intended to be limited thereto and may include any well known dishware such as pottery.

The front surface 36 of each leaf section 22 displays an illustration of the most common consituent of a crystal table setting, the water goblet 52.

The background (not shown) of each illustration on surface 36 of each leaf section may, as desired, be grained to simulate a table top, or colored and shown with a weave design to simulate a tablecloth or place mat.

The reverse surface 38 of each leaf 16, and of the fly-leaf 14 if desired, contains additional information and illustrations relating to the patterns depicted on the opposing front surface 36 of the adjacent leaf sections.

With attention to FIG. 2 the reverse surface 38 of leaf section 18 preferably contains an illustration 54 of a six-piece place setting of the silverware pattern pictured on adjacent surface 36 together with a detailed illustration 56 of the salient design features thereof.

The reverse surface 38 of each leaf section 20 contains preferably an illustration 58 of representative specialized pieces of the china pattern pictured on the adjacent surface 36. Although any specific pieces may be utilized in the preferred version of this invention the cream pitcher 60, the sugar bowl 62, and the coffee-pot 64 are pictured. Illustration 58 also depicts the salient design features of the china pattern.

The reverse surface 38 of each leaf section 22 contains an illustration 66 of a four-piece place setting of the crystal pattern depicted on the adjacent surface 36. Illustration 66 also shows the salient design features of the crystal pattern.

In addition, the surface 38 of each leaf sections 18, 20 and 22 preferably contains indicia 68 describing the pattern illustrated on opposing surface 36 and illustrations 54, 58, and 60. In addition, indicia 70 may be placed on surface 38 to describe the place-setting constituents availabe in the said patterns of silverware, china, and crystal.

If desired, the reverse surface of the fly-leaf 14 may contain illustrations similar to those of leaf surfaces 38 including place setting displays 54 and 56 and display of representative specialized china pieces 58 corresponding to those patterns displayed on the front surface 36 of the sections of the first leaf 16.

With attention to FIGS. 3–7, to utilize the display book of of this invention, the customer orients the book with the center foldline 24 or binder 28 extending laterally from left to right across the field of view. The cover 12 and fly-leaf 14 are then turned as shown in FIG. 7. Leaf sections 18, 20, and 22 are then separately leafed while the customer observes the combined display presented on surface 36 of each leaf section. In the event further information is desired concerning the patterns shown on surface 36 the customer merely glances to the opposing surface 38 for a more complete explanation and illustration.

The customer therefore is able to select any combination of silverware, china, or crystal patterns for viewing as a primary reference. The display presented will be that of he most normally utilized pattern constituents in an arrangement closely approximating table setting order. The arrangement is displayed in the preferred embodiment on a background surface simulating a table top.

In this way as each leaf section is turned a different combination of silverware, china, and crystal is presented in a unitary display. A customer may therefore rapidly view a wide variety of different combinations of representative pieces without a delay associated with changing combinations. Preferably the illustrations on surface 36 are to scale, and in full color.

In summary, a display book is presented for silverware, china, and crystal patterns to alleviate the time-consuming practice of displaying actual place settings thereof for a customer. The display book of this invention includes a cover, at least one fly-leaf, and a binding. Three separate sets of independently pages leaves are contained within the cover. Each leaf in each set contains an illustration of a different silverware, china, or crystal pattern. The front surface of each leaf illustrates the most commonly used pieces thereof, and the opposing reverse surface of the previous leaf illustrates a place setting or specialized pieces thereof, the salient design features, and also contains information identifying the pattern and constituents of the place settings.

Because the front surface illustrations of the leaf sections are disposed with the silverware pattern on one side, the crystal pattern on an opposite side and the china pattern in the middle, and because the front surface depicts the patterns on a simulated table background, a customer views a simulated display of a table setting. The customer may also change displays merely by turning leaf sections until the desired combination is presented. Therefore, the customer may rapidly and efficiently choose a preferred combination of silverware, china, and crystal patterns without the necessity of physically displaying each pattern.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A plurality of changeable, simulated displays portraying, selectively, in composite form, table settings of silver ware, china, and crystal patterns together with identifying information about each pattern comprising:

a cover; at least one flyleaf; and a binding extending longitudinally along an edge thereof, and containing three separate sets of independently paged, rectangular leaves, said sets of leaves being disposed along said binding in a side-by-side relationship, said leaves adapted to have indicia and illustrations printed on the surfaces thereof;

a front surface of each of said leaves in said first set bearing a a different illustration of representative pieces of preselected silver ware patterns on a simulated table surface background, the reverse surface thereof having indicia and illustrations thereon corresponding to the pattern illustrated on the opposing front surface of thead adjacent leaf, said indicia identifying said silver ware pattern and the constituents of a place setting thereof and said illustrations depicting a six-piece setting of the silver ware pattern illustrated on the front surface of the adjacent leaf;

a front surface of each of said leaves in said second set bearing a different illustration of representative pieces of preselected china patterns on a simulated table surface background, a reverse surface thereof having indicia and illustrations thereon corresponding to the pattern illustrated on the opposing front surface of the adjacent leaf, said indicia identifying said china pattern and the constituents of a place setting thereof, and said illustrations depicting the coffee, cream, and sugar containers of the china pattern illustrated on the opposing front surface of the adjacent leaf section;

a front surface of said leaves in said third set bearing a different illustration of a representative piece of preselected crystal patterns on a simulated table surface background, a reverse surface thereof having indicia and illustrations thereon corresponding to the pattern illustrated on the opposing front surface of the adjacent leaf, said indicia identifying said crystal pattern and the constituents of a place setting thereof, and said illustration depicting a four-piece place setting of the crystal pattern illustrated on the opposing front surface of the adjacent leaf section;

the reverse surface of said flyleaf having indicia and illustrations thereon aligned with and corresponding to the patterns of silver ware, china, and crystal illustrated on the front surface of the first leaf in each of said leaf sections, said indicia identifying each of said patterns and the constituents of a place setting thereof and said illustrations depicting the shape of representative pieces;

said indicia and illustrations on said flyleaf and leaves being oriented for viewing when said binding extends laterally across the line of sight whereby when said three sets of leaves are opened for view a combined table setting of preselected patterns of silver ware, china, and crystal are provided on the front surface thereof while identifying indicia and representative illustrations of of shapes are also provided on the opposing reverse surface of of the adjacent leaf sections for a unitary display.

2. The display book of claim 1 wherein said binding includes a plurality of ring fasteners disposed along the inside surface of said cover at the juncture of the front and back portions thereof, said fasteners adapted to engage said leaves at an edge thereof, said fasteners controlled by at least one detent lever so that when said lever is detented to a first position said rings open to disengage said leaves.

3. The display book of claim 1 wherein said binding includes a plurality of fasteners disposed along said cover at the juncture of the front and back portions thereof, said fasteners adapted to pass through said cover and engage said leaves at a central portion thereof to retain said leaves in said cover.

* * * * *

PO-1050
(5/69)

UNITED STATES PATENT OFFICE
CERTIFICATE OF CORRECTION

Patent No. 3,750,309    Dated August 7, 1973

Inventor(s) Henry M. Tovar

It is certified that error appears in the above-identified patent and that said Letters Patent are hereby corrected as shown below:

Column 3, line 13, "surfaceo" should read --surface--.
    Column 4, line 20, "thed" should read --the--.
    Column 5, line 56, "he" should read --the--.
    Column 6, line 6, "pages" should read --paged--;
line 50, Claim 1, "a a" should read --a--; line 55, "thee f"
should read --the--.
    Column 7, line 6, Claim 1, "said leaves" should read
--each of said leaves--.
    Column 8, lines 8 and 9, Claim 1, "of of" should read --of--.

Signed and sealed this 25th day of December 1973.

(SEAL)
Attest:

EDWARD M. FLETCHER, JR.        RENE D. TEGTMEYER
Attesting Officer              Acting Commissioner of Patents